US012798518B2

(12) United States Patent
Layouni et al.

(10) Patent No.: US 12,798,518 B2
(45) Date of Patent: Nov. 17, 2026

(54) SMART VEHICLE SYSTEMS AND CONTROL LOGIC FOR ENHANCED REMOTE KEY RANGING SECURITY THROUGH RANGE VALUE BATCHING

(71) Applicant: GM GLOBAL TECHNOLOGY OPERATIONS LLC, Detroit, MI (US)

(72) Inventors: Mohamed A. Layouni, Fraser, MI (US); Thomas M. Forest, Macomb, MI (US); Jason Grembi, Armada, MI (US); Aaron Adler, Rochester Hills, MI (US); Ron Y. Asmar, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 18/928,338

(22) Filed: Oct. 28, 2024

(65) Prior Publication Data

US 2026/0116341 A1 Apr. 30, 2026

(51) Int. Cl.

*B60R 25/01* (2013.01)
*B60R 25/24* (2013.01)
*G07C 9/00* (2020.01)

(52) U.S. Cl.

CPC ............ *B60R 25/245* (2013.01); *B60R 25/01* (2013.01); *G07C 9/00309* (2013.01);
(Continued)

(58) Field of Classification Search

CPC . B60R 25/245; B60R 25/01; B60R 2325/205; B60R 2325/108; B60R 25/24; B60R 16/037; B60R 25/04; B60R 25/2045; B60R 25/305; B60R 16/02; B60R 2325/202; B60R 25/1003; B60R 25/2036; B60R 2325/103; B60R 2325/105;
(Continued)

(56) References Cited

U.S. PATENT DOCUMENTS 8,638,202 B2 1/2014 Oesterling
9,710,983 B2 7/2017 Asmar
(Continued)

FOREIGN PATENT DOCUMENTS

EP 3425420 B1 1/2019
JP 200576329 A 3/2024
WO WO2021243628 A1 12/2021

*Primary Examiner* — Nimesh Patel
(74) *Attorney, Agent, or Firm* — Quinn IP Law

(57) ABSTRACT

A method of operating a vehicle includes connecting the vehicle's remote keyless entry (RKE) system with a user's wireless-enabled portable electronic device (PED) to receive therefrom a timeseries of wireless signals containing range data to the PED. A vehicle controller uses the range data to calculate range values for each wireless signal, and then sequentially adds a subset of the range values to a value batch. Upon determining that the value batch is full when a total number of range values added to the value batch is equal to a predefined full batch value, the vehicle controller responsively processes the value batch to select a prescribed range value from the added range values. Upon determining that the prescribed range value is less than a preset maximum allowable range, the vehicle controller responsively enables the user to unlock one or more door assemblies of the vehicle and/or start the vehicle's powertrain.

20 Claims, 4 Drawing Sheets

(52) U.S. Cl.
CPC .................... *B60R 2325/205* (2013.01); *G07C 2009/00793* (2013.01); *G07C 2009/00984* (2013.01); *G07C 2209/63* (2013.01)

(58) Field of Classification Search
CPC ................ B60R 25/33; G07C 9/00309; G07C 2009/00793; G07C 2009/00984; G07C 2209/63; G07C 2009/00555; G07C 9/00571; G07C 9/28; G07C 2009/00198; G07C 2009/00865; G07C 9/27; G07C 2009/00579; H04W 4/029; H04W 4/025; H04W 4/46; H04W 24/08; H04W 4/40; H04W 4/027; H04W 4/023; H04W 12/08; H04W 12/06; H04W 12/04; H04W 12/50; H04W 64/006; H04W 12/03; H04W 12/041; H04W 4/44; H04W 4/38; H04W 74/00; H04B 1/38; B60W 2540/043; B60W 2540/227; B60W 2556/45; B60W 50/0098; B60W 50/14; B60W 50/08; B60W 2040/0809; H04M 1/72415; H04M 1/72412; H04M 1/673; H04M 1/724098; H04M 1/724631
See application file for complete search history.

(56) References Cited

U.S. PATENT DOCUMENTS

| | | | | |
|---|---|---|---|---|
| 10,055,919 | B2 | 8/2018 | Asmar | |
| 2014/0067161 | A1 | 3/2014 | Conner | |
| 2014/0142805 | A1* | 5/2014 | Frye | B60K 35/10 701/36 |
| 2015/0116079 | A1* | 4/2015 | Mishra | G07C 9/257 340/5.52 |
| 2016/0019734 | A1* | 1/2016 | Bauman | G07C 9/00309 340/5.61 |
| 2018/0339676 | A1 | 11/2018 | Lazarini | |
| 2020/0349781 | A1* | 11/2020 | Warrier | G01S 11/06 |
| 2022/0194316 | A1* | 6/2022 | Thomas | G07C 9/00309 |
| 2023/0345250 | A1 | 10/2023 | Dutz | |
| 2023/0356677 | A1* | 11/2023 | Przybylski | B60R 16/03 |

* cited by examiner

SMART VEHICLE SYSTEMS AND CONTROL LOGIC FOR ENHANCED REMOTE KEY RANGING SECURITY THROUGH RANGE VALUE BATCHING

INTRODUCTION

The present disclosure relates generally to vehicle access and control systems. More specifically, aspects of this disclosure relate to remote keyless entry systems with enhanced ranging security through distance reduction attack prevention.

Current production motor vehicles, such as the modern-day automobile, may be equipped with a network of onboard sensors, electronic controllers, and wireless communications devices that provide remote vehicle access and operating capabilities. Original equipment manufacturers are moving towards vehicle-to-vehicle (V2V) and vehicle-to-everything (V2X) "talking" cars with higher-level driving automation with the aspiration of producing fully autonomous "self-driving" vehicles competent to navigate among heterogeneous vehicle types in both urban and rural scenarios. In addition to fully and partially autonomous driving capabilities, many vehicles now enable remotely controlled "connected" services, such as remote engine start (RES), remote keyless entry (RKE), remote ignition block (RIB), remote vehicle locator, remote door control, etc. Ultra-wideband (UWB) vehicle communications systems, for example, use a large signal bandwidth for transmitting digital data over a wide spectrum of frequency bands with very low power for provisioning precision localization for RKE initiation and validation.

Activation of a vehicle's powertrain system has traditionally entailed the user entering the vehicle, physically inserting a cut-blade "toothed" key into a lock cylinder of an ignition switch assembly, and rotating the key to close the primary ignition circuit and thereby activate the prime mover. Likewise, access to many automobiles has historically necessitated a user insert a physical key into a mechanical door lock in order to unlock a vehicle door assembly and enter the vehicle's passenger compartment. With the evolution of wireless technology, many modern-day automobiles have supplemented or replaced mechanical toothed keys with remote keyless entry systems that utilize handheld electronic key fobs for wirelessly communicating with the vehicle to enable user access and operation of the vehicle. Access-control key fobs have a wireless transmitter that communicates an encrypted "virtual key" to a dedicated in-vehicle key module that authenticates the virtual key and user location to allow the user to gain access to the vehicle and its functionality.

SUMMARY

Presented herein are smart vehicle systems with attendant control logic for provisioning enhanced ranging security through range measurement value batching, methods for making and methods for operating such systems, and motor vehicles equipped with such systems. By way of non-limiting example, vehicle RKE systems and methods militate against distance reduction attacks on ranging systems using a range measurement value batching and analysis protocol. Ranging is the process by which a verifier device, such as a virtual key module (VKM) and radio-frequency (RF) transceiver of an automobile, measures the distance to a prover device, such as a handheld key fob or smartphone mobile key, as part of a passive RKE validation process. A "distance reduction attack" is a physical-layer assault (tampering operation) that manipulates the signal characteristics of the prover device—intercepting a broadcast responder signal and modifying its frequency to simulate a negative clock drift—to reduce the perceived distance measured by the prover device. The attacker may also interfere with a ranging session between a legitimate prover device and a verifier by injecting an illegitimate signal/message into the signal exchange or replaying past messages sent by the prover to the verifier.

To preempt distance reduction attacks during a passive RKE initiation and validation procedure, the verifier device derives the distance to the prover device by aggregating, filtering, and evaluating one or more batches of range measurements, instead of a single range measurement. Enhanced security is achieved because the probability of an attacker successfully tampering with numerous range measurements within a designated set is significantly lower than the probability of an attacker tampering with any single measurement over the protocol's lifecycle. For instance, a would-be attacker has a much larger number of chances to attack single measurements than to attack batches of measurements within a preset runtime. Assuming the subject "host" vehicle takes 72,000 measurements in a two-hour interval and aggregates values in a batch size of 100, there are 720 batches the attacker is able to target for tampering whereas the number of single measurements the attacker is able to target is 72,000, a 100-fold increase. Moreover, the probability of successfully tampering with substantially all of the range values contained within a given batch is much lower than tampering with any single range value during the entire measurement lifecycle. Different batching methods are presented for processing and analyzing measurement batches to derive a final distance estimate.

Aspects of this disclosure are directed to smart vehicle control systems and RKE system control logic for provisioning enhanced ranging security through range measurement value batching. In an example, a method is presented for operating a motor vehicle with a vehicle powertrain, one or more vehicle door assemblies, and an RKE system operable to control access to the vehicle's doors and/or activation of the vehicle's powertrain. This representative method includes, in any order and in any combination with any of the above and below disclosed options and features: connecting, e.g., via an in-vehicle radio frequency (RF) transceiver (e.g., BLUETOOTH®, NFC, UWB, WiFi, ZIGBEE®), the RKE system with a user's wireless-enabled portable electronic device (PED) (e.g., smartphone, tablet computer, key fob, smartwatch, etc.); receiving, e.g., by a resident or remote microcontroller, central processor, control module, programmable logic device, integrated circuit device, or network of processors/controllers/modules/devices/etc. (collectively "vehicle controller") from the user's PED through the RF transceiver, a timeseries of wireless signals (e.g., range signal responses indexed in order of time at regular intervals) containing range data indicative of an estimated distance to the PED; determining, e.g., via the vehicle controller using the range data, a range measurement value for each wireless signal in the timeseries of wireless signals; sequentially adding a subset of the range values to a range value batch; determining, e.g., via the vehicle controller, the value batch is full when a total number of the range values added to the batch is equal to a predefined full batch value (e.g., batch size S); processing, e.g., via the vehicle controller responsive to determining the value batch is full, the value batch to select a prescribed range value from the added range values; determining if the prescribed range value is less than a preset maximum allowable range; and, if so, responsively enabling, e.g., via the vehicle controller in cooperation with a body control module (BCM) and a powertrain control module (PCM) of the host vehicle, the user to unlock one or more of the vehicle door assemblies and/or start the vehicle powertrain.

Aspects of this disclosure are also directed to computer-readable media (CRM) containing controller-executable instructions for provisioning RKE ranging and validation through range value batching. In an example, a non-transient CRM stores instructions that are executable by a vehicle controller of a motor vehicle. The motor vehicle includes a vehicle door assembly, a vehicle powertrain, and a remote keyless entry system that is operable to control access to the vehicle door and/or activation of the vehicle powertrain. These CRM-stored instructions, when executed, cause the vehicle controller to perform operations, including: connecting, via a radio frequency transceiver of the motor vehicle, the RKE system with a wireless-enabled portable electronic device of a user; receiving, from the wireless-enabled PED through the RF transceiver, a timeseries of wireless signals containing range data indicative of an estimated distance to the wireless-enabled PED; determining, using the range data, a range value for each wireless signal in the timeseries of wireless signals; sequentially adding a subset of the range values to a value batch; determining the value batch is full when a total number of the range values added to the value batch is equal to a predefined full batch value; processing, responsive to determining the value batch is full, the value batch to select a prescribed range value from the range values; determining the wireless-enabled PED is in range when the prescribed range value is less than a preset maximum allowable range; and enabling, responsive to determining the wireless-enabled PED is in range, the user to unlock the vehicle door assembly and/or start the vehicle powertrain.

Additional aspects of this disclosure are directed to intelligent motor vehicles with optimized RKE ranging and validation through range value batching. As used herein, the terms “vehicle” and “motor vehicle” may be used interchangeably and synonymously to include any relevant vehicle platform, such as passenger vehicles, commercial vehicles, industrial vehicles, tracked vehicles, off-road and all-terrain vehicles (ATV), motorcycles, farm equipment, aircraft, watercraft, spacecraft, e-bikes, etc. In an example, a motor vehicle includes a vehicle body with a passenger compartment, multiple road wheels attached to the vehicle body (e.g., via corner modules coupled to a unibody or body-on-frame chassis), and other standard original equipment. Located inside the vehicle body is a vehicle powertrain with a prime mover, which may be in the nature of a traction motor and/or an internal combustion engine assembly, that drives the road wheel(s) to propel the vehicle. One or more vehicle door assemblies are movably mounted to the vehicle body and selectively locked in closed positions via a controller-regulated door lock system.

Continuing with the discussion of the above example, the vehicle also contains a remote keyless entry system with a vehicle controller and an RF transceiver. Using the RF transceiver, the vehicle controller wirelessly connects the RKE system with a user’s wireless-enabled PED to receive therefrom a timeseries of wireless signals containing range data indicative of an estimated distance to the wireless-enabled PED. From this range data, the vehicle controller derives a range value for each received wireless signal and sequentially adds a subset of these range values to a value batch. The controller then determines if a total number of the range values added to the value batch is equal to a predefined full batch value and, thus, the value batch is full; if so, the controller responsively processes the value batch to select a prescribed range value from the added range values. Upon determining that the prescribed range value is less than a preset maximum allowable range, the controller responsively enables the user to unlock the vehicle door assembly and/or start the vehicle powertrain.

For any of the disclosed vehicles, methods, and CRM, processing the value batch may include identifying, from the range values added to the value batch, at least one rejected range value that is designated for removal from the value batch by a predefined rule set. Each rejected range value is then discarded from the value batch. In this instance, the predefined rule set may designate one or more outlier range values or one or more smallest range values in the value batch for removal from the value batch as the rejected range value(s). For example, the predefined rule set may designate the smallest and second smallest range values for removal; a third smallest range value in the value batch (or new smallest value upon removal of the smallest and second smallest values) is then selected as the prescribed range value. Processing the value batch may also include reordering the range values in the value batch in ascending order prior to discarding the smallest and second smallest range values from the value batch.

For any of the disclosed vehicles, methods, and CRM, the predefined rule set may designate multiple outlier range values for removal from the value batch. In this instance, processing the value batch may include selecting a largest range value in the value batch as the prescribed range value upon removal of the outlier range values. Identifying the rejected range value(s) for removal may include calculating a mean average and a standard deviation for the range values in the value batch, calculating a batch interval as a function of the mean average and the standard deviation, and then selecting the outlier range values as those range values in the value batch that fall outside the batch interval.

For any of the disclosed vehicles, methods, and CRM, processing the value batch may include reordering the range values in the value batch in ascending order, determining an index position within the reordered value batch, and selecting the range value located at the index position within the reordered value batch as the prescribed range value. In this instance, the index position $I_p$ may be calculated as:

$$I_p = \left(\left\lfloor \frac{P}{100} \times S \right\rfloor + 1\right)$$

where S is a batch size of the value batch, and P is a target percentile number. The target percentile number P may be preset as 50 for a median batching method or as 75 for a third-quartile batching method.

For any of the disclosed vehicles, methods, and CRM, the batching method may include creating an empty value batch sans range values prior to determining range values for the wireless signals. As another option, the batching method may include emptying the value batch after processing the value batch to select the prescribed range value. It is also envisioned that the vehicle controller may be embodied as a virtual key module and the user’s wireless-enabled PED may be embodied as a smartphone with a mobile key or a key fob with a virtual key. In this instance, the smartphone and key fob are designed to passively connect to and communicate with the VKM (i.e., without human activation or intervention). Prior to connecting the vehicle's RKE system to the user's wireless-enabled PED, the PED may passively transmit to the VKM a device ranging intent signal requesting to connect the PED to the RKE system. In response to receiving the device ranging intent signal, the VKM may transmit a ranging mode prompt to the PED to transmit the timeseries of wireless signals containing the range data.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
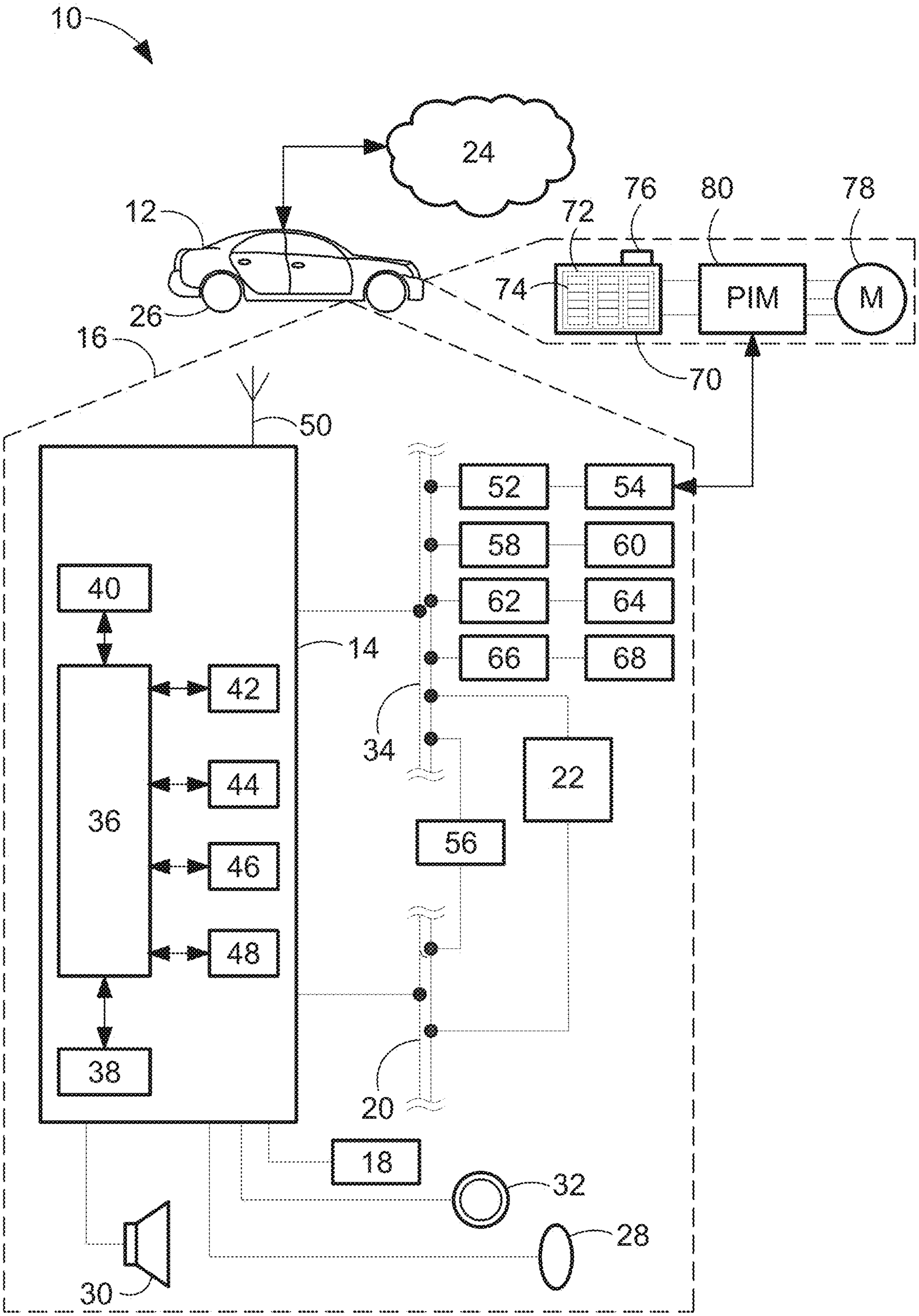
FIG. 1 is a partially schematic, side-view illustration of a representative motor vehicle with a remote keyless entry (RKE) system and a network of in-vehicle controllers, sensing devices, and communication devices for provisioning RKE ranging and validation through range value batching in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for case of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts using a handheld key fob to perform passive device ranging and validation should be appreciated as a non-limiting implementation of disclosed features. As such, it will be understood that aspects of this disclosure may be implemented using other wireless-enabled PEDs with RKE functionality, may be used to perform assorted RKE ranging operations, and may be incorporated into any logically relevant type of motor vehicle. Moreover, only select components of the motor vehicle and vehicle RKE system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for the telematics unit 14 or may be part of an audio system 22. The audio system 22 is connected to a network connection interface 34 and an audio bus 20 to receive analog information, rendering it as sound, via the one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, a Virtual Key Module (VKM) 54, a Body Control Module (BCM) 56, a Steering Control Module (SCM) 58, a Brake System Control Module (BSCM) 60, and assorted other vehicle ECUs, such as a Transmission Control Module (TCM), an Engine Control Module (ECM), a Sensor System Interface Module (SSIM), an Electronic Battery Control Module (EBCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit, UWB gateway, or near field communications (NFC) transceiver), a dedicated short-range communications (DSRC) component 48, and/or a dual RF antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, inertial measurement unit (IMU), etc., for detecting longitudinal and lateral acceleration, yaw, roll, and/or pitch rates, steering angle, and other dynamics related parameters. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organo-silicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

A user may attempt to enter and operate the motor vehicle 10 using a wireless-enabled portable electronic device (PED), such as a handheld key fob with a virtual key or a smartphone with a mobile key, to identify and authenticate themselves to the vehicle. To initiate remote keyless entry, for example, the user may actively prompt the vehicle to authenticate the user by manually selecting a desired vehicle function, e.g., by depressing an electromechanical "unlock" button on the key fob or pressing a soft-touch "autostart" button on the smartphone. Many contemporary remote keyless entry systems also allow the user to passively authenticate themselves merely by positioning the digital key-bearing PED within a predetermined proximity to the vehicle (e.g., carrying the key fob while within approximately 1.5-2.0 meters (m) of the vehicle's RFID, BLER or NFC transceiver). Irrespective of whether the user employs active or passive authentication techniques, the host "ego" vehicle may initiate a ranging mode to estimate a real-time or near-real-time distance to the PED numerous times within a designated timeframe (e.g., ~10-50 measurements/second) as part of the user validation process.

Presented below are range value batching techniques for provisioning keyless entry ranging for user validation. In a typical ranging mode of operation, a timeseries of wireless signal frames (e.g., short-duration UWB signal pulses) will be exchanged between a verifier device, such as an embedded or standalone VKM and mated RF transceiver, and a prover device, such as the user's handheld key fob or smartphone. A single-sided two-way ranging (SS-TWR) or double-sided two-way ranging (DS-TWR) operation—colloquially designated as "ping-pong" schemes—may be carried out to estimate UWB channel impulse responses (CIRs) on both devices. Signal propagation path data contained in these CIR parameters may then be used to generate timestamps for ranging signals exchanged by the two devices. A time of flight (ToF) may then be calculated for each ranging signal as a time difference between a signal emission timestamp and a corresponding signal receipt timestamp of that signal. From each ToF and the universally established speed of radio waves (e.g., approximately 299,250 kilometers per second (km/s)), an estimated range value (e.g., a distance measurement) may be calculated using Newtonian mechanics. In addition to using ToF, device ranging may be accomplished using other suitable techniques, including phase-delay ranging techniques and RF-carrier phase ranging techniques. The format of these UWB signal frames may be dictated by the technical standards set forth in IEEE 802.15.42-2020, which is incorporated herein by reference in its entirety and for all purposes.

Where most traditional RKE ranging procedures evaluate a single range measurement value, presented below are batching strategies that preempt distance reduction attacks by aggregating, filtering, and evaluating one or more batches of range measurements. While not per se limited, disclosed RKE batching methods may be particularly effective for passive-type keyless user identification and validation protocols that leverage secure UWB ranging to disarm and unlock the host vehicle based on the vehicle's determination of a real-time distance to the user's previously-paired key fob or smartphone. In practice, when the previously-paired smartphone or key fob approaches the host vehicle and is within signal transmission range (e.g., 20-30 m key fob range), the vehicle recognizes the device using an established (BLE/NFC/RFID/UWB) authentication handshake. Once device authentication is complete, the vehicle exchanges the parameters of the ranging session with the fob/phone and then initiates the ranging session. For passive keyless entry, the host vehicle may trigger secure ranging with a user's PED if either of the following conditions is satisfied: (1) PED sends "device ranging intent" command to host vehicle and host vehicle evaluates PED's signal strength to confirm that the PED is likely approaching the host vehicle; or (2) the host vehicle confirms that the user intends to use an RKE-enabled vehicle feature that utilizes secure ranging with the user's PED, e.g., user pulls door handle or presses unlock button on door. Attendant benefits for at least some of the disclosed batching techniques include maximizing system security while reducing false-positive rejections and maintaining a reduced network latency.

Figure 2:
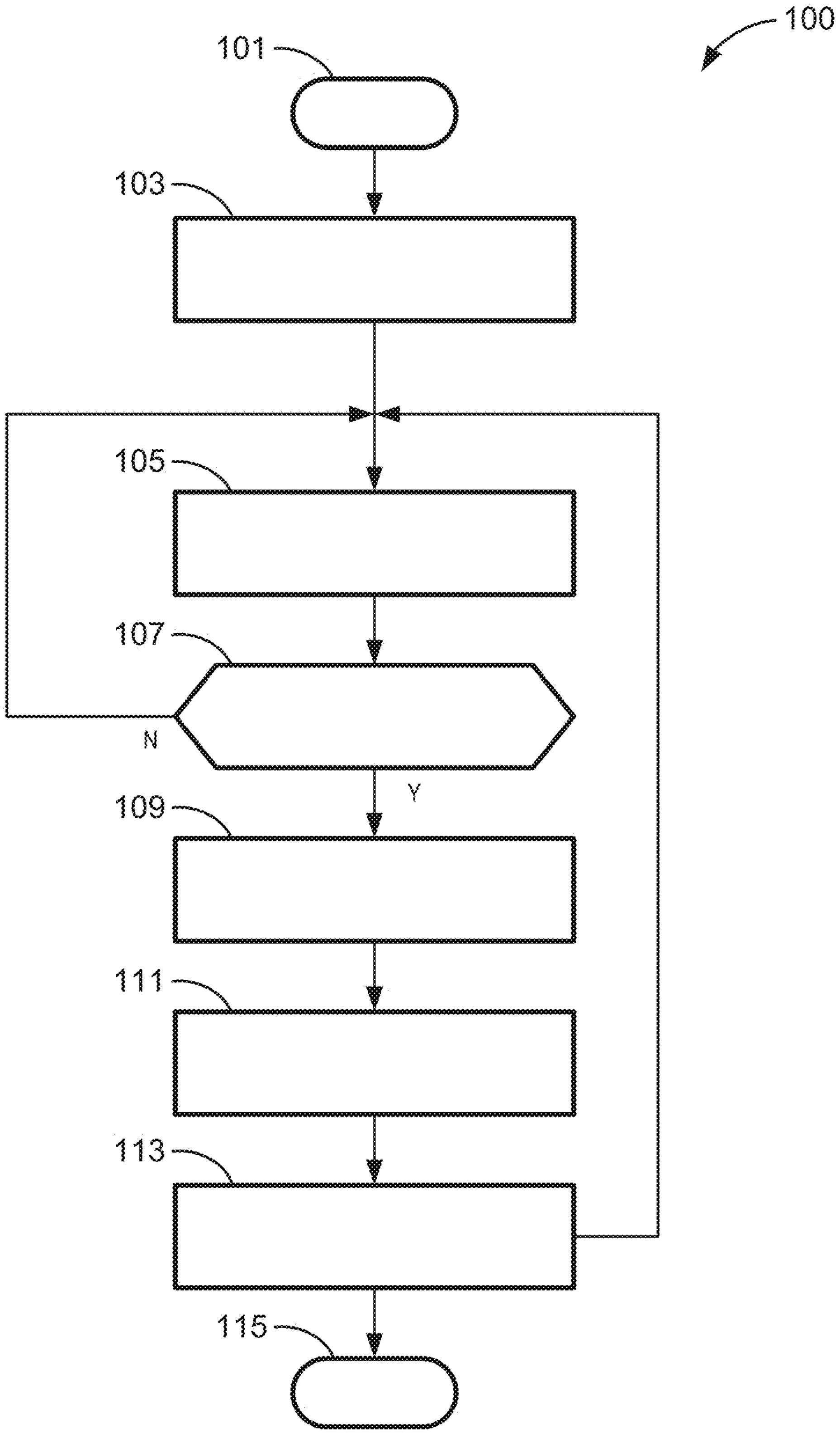
FIG. 2 is a flowchart illustrating a representative remote keyless entry protocol for enhanced ranging security through range value batching, which may correspond to non-transient, memory-stored instructions that are executable by a resident or remote microcontroller, central processor, control module, programmable logic circuit, or other integrated circuit (IC) device or network of circuits/modules/microcontrollers/IC devices (collectively "controller") in accordance with aspects of the present disclosure.

With reference next to the flowchart of FIG. 2, an improved method or control protocol for provisioning keyless entry features using range value batching for a host vehicle, such as automobile 10 of FIG. 1, with a resident RKE system, such as VKM 54 and SRC device 46, is generally described at 100 in accordance with aspects of the present disclosure. Some or all of the operations illustrated in FIGS. 2-5 and described in further detail below may be representative of an algorithm or algorithms that correspond(s) to non-transient, processor-executable instructions that are stored, for example, in main or auxiliary or remote memory (e.g., resident vehicle memory device(s) 38 and/or remote cloud service 24 database of FIG. 1). These instructions may be executed, for example, by a microcontroller, processing unit, programmable logic circuit, dedicated control module, or other module or device or network of controllers/modules/devices (e.g., vehicle CPU 36 and/or BO server-class computer of cloud host service 24), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 may begin at START terminal block 101 of FIG. 2 with memory-stored, processor-executable instructions for initializing a range value batching process for provisioning RKE ranging and validation. This routine may be initialized in real-time, near real-time, continuously, systematically, sporadically, and/or at predefined time intervals, for example, each 10 or 100 milliseconds during use of the motor vehicle 10 of FIG. 1. As yet another option, terminal block 101 may initialize responsive to a user command prompt (e.g., input by wireless-enabled PED), a resident vehicle controller prompt (e.g., from CPU 36), or a broadcast prompt signal received from a centralized back-office (BO) vehicle services system (e.g., from cloud host service 24). By way of non-limiting example, method 100 may automatically initialize upon receipt of a device ranging intent signal from a PED or a user-borne input signal to employ an RKE-enabled vehicle feature. Upon completion of some or all of the control operations presented in FIG. 2, method 100 may advance to END terminal block 115 and temporarily terminate or, optionally, may loop back to terminal block 101 and run in a continuous loop.

Advancing from terminal block 101 to EMPTY BATCH subroutine 103, method 100 may create one or more empty range value batches that do not contain any range measurement values. With reference again to the non-limiting example of FIG. 1, the automobile 10 may wirelessly connect the VKM 54 with a user's key fob or other wireless-enabled PED via the SRC device 46 and the dual RF antenna 50. To prompt this device-to-device connection, the user's fob/smartphone/PED may passively connect to and communicate with the VKM 54 without user activation or intervention. For instance, the PED may passively transmit a device ranging intent signal to the VKM 54 prior to connecting the PED with the RKE system. Upon receipt of this ranging intent request, the VKM 54 may responsively broadcast a ranging mode prompt to the user's PED to begin transmitting a timeseries of wireless signals that contain range data indicative of an estimated distance to the wireless-enabled PED. It may be desirable that the empty range value batches be arranged sequentially and share a common size (e.g., each contains ten (10) consecutively indexed value positions).

Prior to, contemporaneous with, or after executing subroutine 103, method 100 may execute RANGE MEASUREMENT subroutine 105 to make range measurements that will be added to the available range value batch or batches. Once paired, the vehicle VKM 54 may communicate through the SRC device 46 and RF antenna 50 with the user's wireless-enabled PED to receive therefrom a timeseries of UWB signal pulses that contain CIR data with associated timestamp and ToF information. Using the range data contained in these signals, the VKM 54 calculates a corresponding range value for each received signal in the timeseries of UWB signal pulses, e.g., as explained above. For a DS-TWR operation, each instance of "ranging" may necessitate at least three (3) UWB messages and one (1) subsequent data message from the user's PED to the host vehicle's RKE system. In practice, the smartphone/fob may act as the initiator device and the vehicle may act as the responder device B. As the range values are generated, the VKM 54 may sequentially add a select subset of the calculated range values, e.g., on a first-in, first-out (FIFO) basis, to a range value batch.

As an empty value batch is gradually filled with range values, method 100 may determine when each value batch is full, as indicated at FULL BATCH decision block 107. For instance, the vehicle VKM 54 may conclude that a subject value batch is full when a total number of the range values added to that batch is equal to a predefined full batch value (e.g., ten range values added to batch with ten available value positions). If the subject value batch is not full (Block 107=NO), method 100 may responsively loop back to subroutine 105 and continue to generate and add range values to that batch until it is full. It is envisioned that the full batch value may be preset and unchanging or, alternatively, may be dynamically varied. To harden system security, for example, the verifier host vehicle may systematically or randomly change a batch size within a predefined interval. Increasing batch size likewise increases the difficulty for a bad actor to attack that batch.

Upon determining that a value batch is full (Block 107=YES), method 100 may responsively execute BATCH PROCESSING subroutine 109 to selectively modify the filled value batch using any one or more of the herein-described batch processing methods. By way of example, and not limitation, the VKM 54 of FIG. 1 may process the value batch to evaluate, reorder, and/or filter the range values added to that batch and select a prescribed range value from the values remaining in the batch after processing. As will be explained below in the discussions of the representative batch processing methods presented in the Figures, a value batch may be processed by first evaluating all range values added to that value batch to identify one or more "rejected" range values that are designated by a predefined rule set for removal from the value batch. Once identified, the rejected range value or values are then removed or disregarded (collectively "discarded") from the value batch. The predefined rule set may designate one or more outlier range values or one or more smallest range values as rejected and marked for removal from the value batch. Value batch processing may also entail reordering the range values added to the value batch in ascending order. After discarding and/or reordering the rejected range values from the value batch, the VKM 54 selects a prescribed range value (e.g., a largest remaining range value, a smallest remaining range value, an average of the remaining range values, an indexed value, etc.) for ranging the user's PED.

After selecting the prescribed range value, method 100 executes RKE RANGING subroutine 111 to determine whether or not the user's PED is within range of the host vehicle and, thus, whether or not to authorize use of one or more RKE-enabled vehicle features. Vehicle VKM 54 of FIG. 1, for example, may determine if the prescribed range value (e.g., estimated PED range distance of 1.1 m) is less than a preset maximum allowable range (e.g., vehicle-calibrated 1.5 m geofence). If not, the VKM 54 may responsively deny access to the host vehicle and, optionally, temporarily blacklist the user's PED. On the other hand, VKM 54 may conclude that the prescribed range value is less than the maximum allowable range and responsively prompt the BCM 56 to disable the vehicle alarm system and allow the user to lock/unlock/open/close one or more of the host vehicle's door assemblies. At the same time, the VKM 54 may prompt the host vehicle's PCM 52 to enable the user to start/stop the host vehicle's powertrain. Upon completion of the RANGING subroutine 111, method 100 of FIG. 2 may empty the processed value batch at PURGE BATCH process block 113; method 100 may thereafter temporarily terminate at terminal block 115 or may loop back to RANGE MEASUREMENT subroutine 105.

Figure 4:
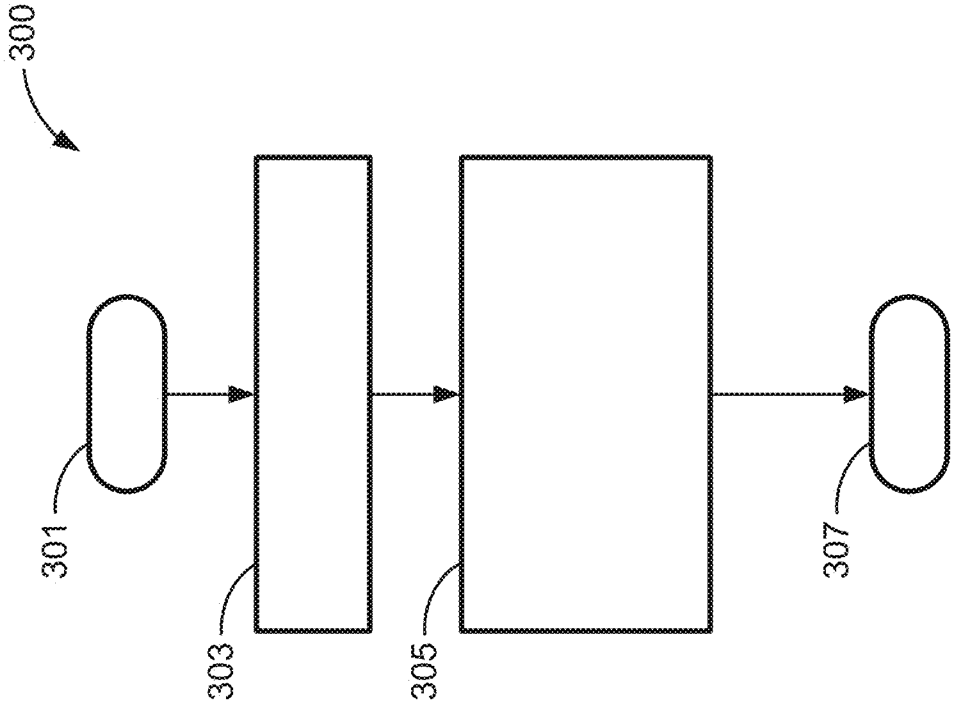
FIG. 4 is a flowchart illustrating representative percentile, median, and quartile batch processing methods that may be implemented with the representative RKE protocol of FIG. 2 in accordance with aspects of the present disclosure.
Figure 3:
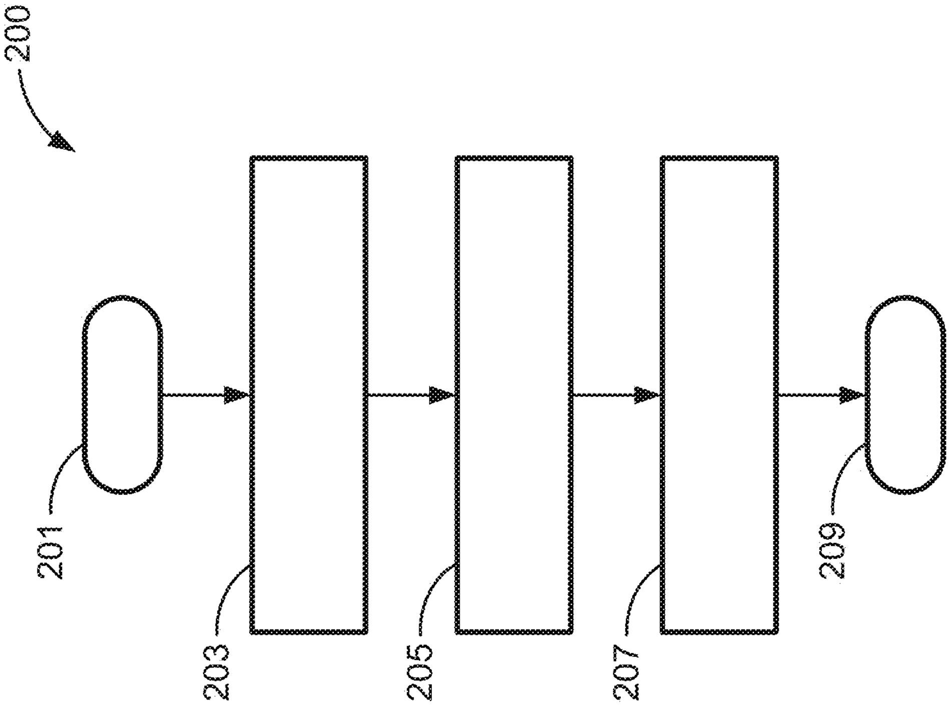
FIG. 3 is a flowchart illustrating a representative smallest entry expungement batch processing method that may be implemented with the representative RKE protocol of FIG. 2 in accordance with aspects of the present disclosure.
Figure 5:
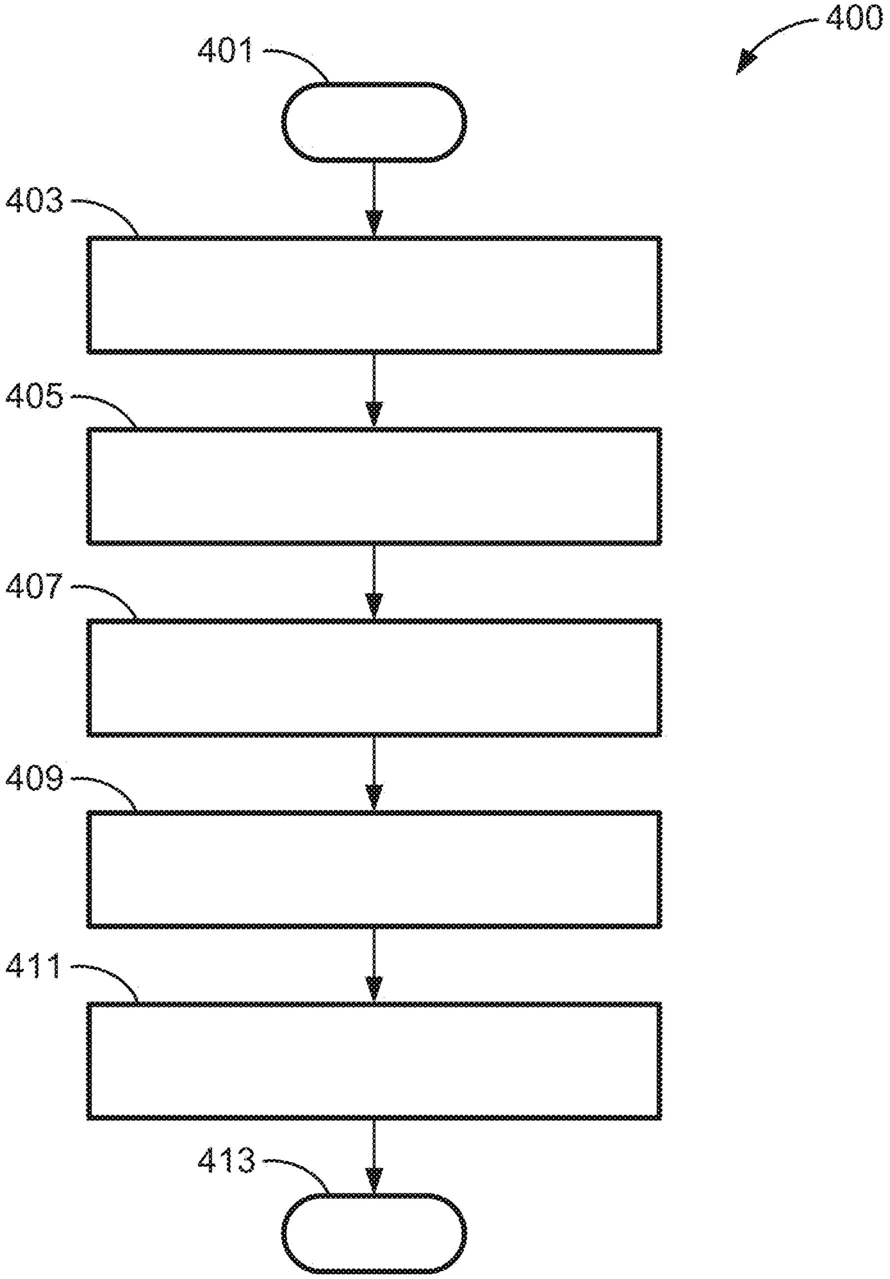
FIG. 5 is a flowchart illustrating a representative sanitize-then-max batch processing method that may be implemented with the representative RKE protocol of FIG. 2 in accordance with aspects of the present disclosure.

Turning next to FIGS. 3-5, there are shown three examples of value batch processing methods that may be implemented with the representative value batching protocol 100 of FIG. 2 for provisioning RKE ranging and validation. Batch processing method 200 of FIG. 3—referred to herein as "Ignore-Bottom-Two Batching Method"—expunges the smallest entry or entries from each value batch in order to purge those range values that are most likely to have been tampered with by an attacker before conducting the ranging protocol. In this example, the batch processing method 200 may first reorder the range measurements in ascending order, i.e., from smallest range value to largest range value. Method 200 then discards one or more of the smallest range measurements and, once removed, returns the smallest of the remaining range measurements for device ranging purposes. Alternatively, method 200 of FIG. 3 may return the median or mean average of the reordered values for device ranging. In general, the Ignore Bottom Two Batching Method may: (1) receive as input a batch of measurements of batch size S; (2) sort the measurements in the batch in ascending (or descending) order; (3) discard the first two (or last two) values in the reordered set; and (4) after discarding the two smallest values, return the first (or last) value of the reordered and filtered set.

Batch processing method 200 of FIG. 3—which may be embedded within subroutine 109 of FIG. 2—may begin a START terminal block 201 with receiving a value batch filled with range values determined for a timeseries of wireless signals received from a user's wireless-enabled PED. At BATCH MODIFICATION process block 203, method 200 may reorder the received value batch's range values, e.g., in ascending order, prior to discarding one or more rejected range values from the value batch. After reordering the range values, the two smallest range value entries, which should now be located in the first two spots of the reordered batch, are discarded at BATCH FILTER process block 205. Method 200 advances from process block 205 to PRESCRIBED RANGE VALUE process block 207 and returns the new smallest range value entry, which was originally the third smallest range value and should now be located in the first spot of the reordered and filtered batch, as the prescribed range value. After returning the new minimum range value (or, alternatively, the mean, median or other suitable average range value) of the reordered and filtered set, method 200 may conclude at END terminal block 209; at this juncture, method 100 may use the returned range value to perform RKE RANGING subroutine 111.

Turning next to FIG. 4, there is shown an example of a Percentile Batching Method 300 for provisioning RKE ranging and validation. The batch processing method 300, which is also representative of a "Median Batching Method" and a "3$^{rd}$ Quartile Batching Method", reorders and indexes the value batch in order to effectively nullify those range values in the batch that are most likely to have been tampered with by a would-be attacker. In this example, the batch processing method 300 may start by first receiving a range measurement batch of size S, which may be a system-calibrated parameter. The received batch of measurements may be sorted in ascending or descending order with each range value assigned to a respective index position. Method 200 thereafter retrieves, calculates, or receives (collectively "determines") an index position $I_p$ within the sorted value batch. The index position $I_p$ may be a function of a target percentile value P (an integer [1,99]) that is used to determine which of the range values is returned and used for ranging purposes. From a cybersecurity point of view, a higher target percentile P provides stronger system security; however, making P too large can lead to an overly restrictive system that can result in false-positive rejections against legitimate users. The range measurement located at index position $I_p$ in the sorted batch is identified and returned. The batch processing method 300 may output a single measurement that is likely to reflect a real-time or near-real-time distance between the host vehicle and the key fob/smartphone.

Batch processing method 300 of FIG. 4—which may be embedded within subroutine 109 of FIG. 2—may begin a START terminal block 301 by receiving a value batch filled with range values for a subject PED undergoing ranging and validation. At BATCH MODIFICATION process block 303, method 300 may reorder the in-batch range values, e.g., in ascending order, prior to selecting a prescribed range value. Method 300 thereafter executes VALUE INDEX subroutine 305 to determine an index position within the reordered value batch and select the range value located at the index position within the reordered value batch as the prescribed range value. In accord with the illustrated example, the index position $I_p$ is calculated as:

$$I_p = \left(\left\lfloor \frac{P}{100} \times S \right\rfloor + 1\right)$$

where S is a batch size of the value batch, P is a target percentile number, and $\lfloor . \rfloor$ denotes a floor function. After returning the range value located at index position $I_p$ of the reordered set, method 300 may conclude at END terminal block 307; at this juncture, method 100 may use the returned range value to perform RKE RANGING subroutine 111.

A Third Quartile Batching Method permutation of method 300 predefines the target percentile number P as 75. In this instance, the batch processing method 300 sorts the batch measurements in ascending order and returns the range measurement located ¾ of the way +1 from the bottom-most index position (i.e., the algorithm returns the measurement at index ($\lfloor 0.75 \times s \rfloor + 1$) in the sorted list. Comparatively, a Median Batching Method permutation of method 300 is a specific case of percentile batching in which the target percentile number P is preset at 50. In this instance, the batch processing method 300 sorts the batch measurements in ascending order and returns the range measurement located ½ of the way +1 from the bottom-most index position (i.e., the algorithm returns the measurement at index ($\lfloor 0.5 \times s \rfloor + 1$) in the sorted list.

Designated generally at 400 in FIG. 4 is a Sanitize-then-Max Batching Method that expunges outlier entries from a value batch in order to purge those range values that are likely to be overestimated range errors output by legitimate devices while ignoring values that are likely to have been tampered with by an attacker. In this example, the batch processing method 400 uses an outlier detection algorithm to identify one or more outliers in a range measurement batch. Once identified, the batch processing method 400 "sanitizes" the set by disregarding or removing the outlier measurements, if any, from the batch. Next, the method 400 sets the result of the batch processing as the largest value over the measurements remaining in the sanitized batch (i.e., sanitize-then-max batching output=MAX over {Input Batch\Outliers}). In algorithmic terms, the method 400 may be summarized as follows: (1) receive as input a measurement batch of batch size S; (2) sanitize the received measurement batch using a predefined outlier detection algorithm; (3) identify a largest range measurement in the sanitized batch; and (4) output the identified measurement as indicative of an estimated distance from the user' PED and the host vehicle. An example of an outlier detection algorithm may input a set of range values and compute a mean average and a standard deviation over the input set. The outlier detection algorithm may thereafter discard any range values that are more than predetermined number of standard deviations away from the mean average, and thereafter output a sanitized value set containing the initial set of range values minus any outliers.

Batch processing method 400 of FIG. 5—which may be embedded within subroutine 109 of FIG. 2—may begin a START terminal block 401 with receiving a value batch filled with range values associated with a timeseries of wireless ranging signals received from a user's wireless-enabled PED. At SANITIZE BATCH subroutine 403, method 400 identifies one or more outlier range values for removal from the value batch. To ascertain which of the in-batch range values is/are outliers, method 400 may execute OUTLIER COMPUTATION process block 405 to calculate a mean average (m) and a standard deviation for the range values in the subject value batch. Advancing to OUTLIER IDENTIFICATION process block 407, batch processing method 400 may select any range values in the value batch that fall outside a batch interval that is calculated as a function of the mean average and the standard deviation. For instance, a batch interval B[a,b] may be calculated as:

$$B[a, b] = [m - (3 \times std), m + (3 \times std)]$$

With a batch size S of 10, for example, the VKM 54 may collect ten consecutive wireless ranging signals, derive ten distance estimates from the aggregated signals, then add the derived estimates to a value batch. Once the batch is filled, the VKM 54 computes a mean average and a standard deviation for the filled batch; the VKM 54 then evaluates all of the in-batch distance estimates to identify any outliers. It may be desirable that the VKM 54 process the signals from each ranging session separately; each ranging session may result in one ranging measurement with the resultant ranging measurements then batched. A VKM may typically complete ten (10) or more ranging sessions/measurements per second.

After identifying the outlier range values, if any, in the subject value batch, method 400 discards the outlier range value(s) at OUTLIER REMOVAL process block 409. Continuing with the preceding example, for each value $v_{1:10}$ in the value set, if $m-(3 \times std)<v<m+(3 \times std)$, the VKM 54 keeps that value in the set; if not, the VKM 54 disregard/removes that value from the set. Method 400 advances from process block 409 to PRESCRIBED RANGE VALUE process block 411 and returns the largest range measurement entry ("max range value") of the filtered batch as the prescribed range value. After returning the largest range value of the filtered set, method 400 may conclude at END terminal block 413; at this juncture, method 100 may use the returned range value to perform RKE RANGING subroutine 111.

As another option for selecting a prescribed range value for RKE initiation and validation of a user, a Max Range Value Batching method may simply identify and return a largest range value of an unfiltered set. Recognizing that most would-be attackers typically seek to introduce reduced range values, the Max Range Value Batching process effectively ignores those range values that are most likely to be falsified range values. Another available approach includes batching using an Average Range Value Batching method in which the system computes a mathematical mean average or median for an "unsanitized" batch and uses the resultant value for RKE evaluation to validate user. As yet another option, a Max Subset Average Value Batching method may select a maximum average value from a set of average values computed for multiple range value batches (e.g., Max of averages of subsets of size s0=s/n). An available modification to the Sanitize-then-Max batching method described above would be a Sanitize-then-Average approach in which the system uses a mathematical average of the outlier-sanitized set rather than the remaining maximum range value.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle with a remote keyless entry (RKE) system, a vehicle door assembly, and a vehicle powertrain, the method comprising:

connecting, via a radio frequency (RF) transceiver of the motor vehicle, the RKE system with a wireless-enabled portable electronic device (PED) of a user;

receiving, via a vehicle controller from the wireless-enabled PED through the RF transceiver, a timeseries of wireless signals containing range data to the wireless-enabled PED;

determining, via the vehicle controller using the range data, a range value for each wireless signal in the timeseries of wireless signals;

adding, sequentially via the vehicle controller, a subset of the range values determined for the timeseries of wireless signals to a value batch;

determining, via the vehicle controller, the value batch is full when a total number of the range values added to the value batch is equal to a predefined full batch value;

processing, via the vehicle controller responsive to determining the value batch is full, the value batch to select a prescribed range value from the range values; and enabling, via the vehicle controller responsive to a determination that the prescribed range value is less than a preset maximum allowable range, the user to unlock the vehicle door assembly of the motor vehicle and/or start the vehicle powertrain of the motor vehicle.

2. The method of claim 1, wherein processing the value batch includes:

identifying, from the range values added to the value batch, one or more rejected range values designated for removal from the value batch by a predefined rule set; and discarding the one or more rejected range values from the value batch.

3. The method of claim 2, wherein the predefined rule set designates an outlier range value or a smallest range value of the range values added to the value batch for removal from the value batch as the one or more rejected range values.

4. The method of claim 3, wherein the predefined rule set designates the smallest range value and a second smallest range value for removal, and wherein processing the value batch includes selecting a third smallest range value in the value batch as the prescribed range value.

5. The method of claim 4, wherein processing the value batch further includes reordering the range values in the value batch in ascending order prior to discarding the smallest range value and the second smallest range values from the value batch.

6. The method of claim 3, wherein the predefined rule set designates a plurality of the outlier range values for removal from the value batch, and wherein processing the value batch includes selecting a largest range value in the value batch as the prescribed range value.

7. The method of claim 6, wherein identifying the one or more rejected range values includes:

calculating a mean average and a standard deviation for the range values in the value batch; and selecting the outlier range values as the range values in the value batch that fall outside a batch interval calculated as a function of the mean average and the standard deviation.

8. The method of claim 1, wherein processing the value batch includes:

determining a reordered value batch by reordering the range values in the value batch in ascending order; and determining an index position within the reordered value batch, selecting the range value located at the index position within the reordered value batch as the prescribed range value.

9. The method of claim 8, wherein the index position is calculated as:

$$I_p = \left(\left\lfloor \frac{P}{100} \times S \right\rfloor + 1\right)$$

where $I_p$ is the index position; S is a batch size of the value batch, and P is a target percentile number.

10. The method of claim 9, wherein the target percentile number P is preset as 50 for a median batching method or as 75 for a third-quartile batching method.

11. The method of claim 1, further comprising:

creating the value batch as an empty batch sans range values prior to determining the range values for the timeseries of wireless signals; and emptying the value batch after processing the value batch to select the prescribed range value.

12. The method of claim 1, wherein the vehicle controller includes a virtual key module (VKM), and wherein the wireless-enabled PED includes a smartphone with a mobile key or a key fob with a virtual key each configured to passively connect to and communicate with the VKM.

13. The method of claim 12, further comprising:

transmitting, passively via the wireless-enabled PED to the VKM prior to connecting the RKE system to the wireless-enabled PED, a device ranging intent signal requesting to connect the wireless-enabled PED to the RKE system; and transmitting, via the VKM responsive to receiving the device ranging intent signal, a ranging mode prompt to transmit the timeseries of wireless signals containing the range data.

14. A non-transient, computer-readable medium storing instructions executable by a vehicle controller of a motor vehicle, the motor vehicle including a vehicle door assembly, a vehicle powertrain, and a remote keyless entry (RKE) system operable to control access to the vehicle door and/or activation of the vehicle powertrain, the instructions, when executed, causing the vehicle controller to perform operations comprising:

connecting, via a radio frequency (RF) transceiver of the motor vehicle, the RKE system with a wireless-enabled portable electronic device (PED) of a user;

receiving, from the wireless-enabled PED through the RF transceiver, a timeseries of wireless signals containing range data indicative of an estimated distance to the wireless-enabled PED;

determining, using the range data, a range value for each wireless signal in the timeseries of wireless signals;

sequentially adding a subset of the range values to a value batch;

determining the value batch is full when a total number of the range values added to the value batch is equal to a predefined full batch value;

processing, responsive to determining the value batch is full, the value batch to select a prescribed range value from the range values;

determining the wireless-enabled PED is in range when the prescribed range value is less than a preset maximum allowable range; and enabling, responsive to determining the wireless-enabled PED is in range, the user to unlock the vehicle door assembly and/or start the vehicle powertrain.

15. A motor vehicle, comprising:

a vehicle body;

a plurality of road wheels attached to the vehicle body;

a vehicle powertrain including a prime mover attached to the vehicle body and configured to drive at least one of the road wheels to thereby propel the motor vehicle;

a vehicle door assembly movably attached to the vehicle body; and a remote keyless entry (RKE) system attached to the vehicle body and including a vehicle controller and a radio frequency (RF) transceiver, the vehicle controller programmed to:

connect, via the RF transceiver, the RKE system with a wireless-enabled portable electronic device (PED) of a user;

receive, from the wireless-enabled PED through the RF transceiver, a timeseries of wireless signals containing range data indicative of an estimated distance to the wireless-enabled PED;

determine, using the range data, a range value for each wireless signal in the timeseries of wireless signals;

sequentially add a subset of the range values to a value batch;

determine the value batch is full when a total number of the range values added to the value batch is equal to a predefined full batch value;

responsive to determining the value batch is full, process the value batch to select a prescribed range value from the range values; and responsive to a determination that the prescribed range value is less than a preset maximum allowable range, enable the user to unlock the vehicle door assembly and/or start the vehicle powertrain.

16. The motor vehicle of claim 15, wherein processing the value batch includes:

identifying, from the range values added to the value batch, one or more rejected range values designated for removal from the value batch by a predefined rule set; and discarding the one or more rejected range values from the value batch.

17. The motor vehicle of claim 16, wherein the predefined rule set designates a smallest range value and a second smallest range value of the range values added to the value batch for removal, and wherein processing the value batch includes selecting a third smallest range value of the range values added to the value batch as the prescribed range value.

18. The motor vehicle of claim 16, wherein the predefined rule set designates a plurality of outlier range values of the range values added to the value batch for removal, and wherein processing the value batch includes selecting a largest range value of the range values added to the value batch as the prescribed range value.

19. The motor vehicle of claim 18, wherein identifying the one or more rejected range values includes:

calculating a mean average and a standard deviation for the range values in the value batch; and selecting the outlier range values as the range values in the value batch that fall outside a batch interval calculated as a function of the mean average and the standard deviation.

20. The motor vehicle of claim 15, wherein processing the value batch includes:

determining a reordered value batch by reordering the range values in the value batch in ascending order; and determining an index position within the reordered value batch, wherein processing the value batch includes selecting the range value located at the index position within the reordered value batch.

* * * * *